United States Patent
Shimomura

(10) Patent No.: US 11,877,272 B2
(45) Date of Patent: Jan. 16, 2024

(54) BASE STATION DEVICE, TERMINAL DEVICE, AND WIRELESS COMMUNICATION SYSTEM

(71) Applicant: FUJITSU LIMITED, Kawasaki (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 498 days.

(21) Appl. No.: 17/198,631

(22) Filed: Mar. 11, 2021

(65) Prior Publication Data

US 2021/0204289 A1 Jul. 1, 2021

Related U.S. Application Data

(63) Continuation of application No. PCT/JP2018/036015, filed on Sep. 27, 2018.

(51) Int. Cl.
*H04W 4/00* (2018.01)
*H04W 72/0453* (2023.01)
(Continued)

(52) U.S. Cl.
CPC ....... *H04W 72/0453* (2013.01); *H04W 16/14* (2013.01); *H04W 72/23* (2023.01)

(58) Field of Classification Search
CPC . H04W 72/0453; H04W 16/14; H04W 72/23; H04W 28/04; H04W 72/541;
(Continued)

(56) References Cited

U.S. PATENT DOCUMENTS

2008/0225931 A1* 9/2008 Proctor .............. H04B 7/15585
455/24
2009/0253452 A1* 10/2009 Kato ..................... H04W 88/08
455/509

(Continued)

FOREIGN PATENT DOCUMENTS

CN 107332646 A 11/2017
EP 3 522 595 A1 8/2019
(Continued)

OTHER PUBLICATIONS

First Notification of Office Action and Search Report issued by the China National Intellectual Property Administration for corresponding Chinese Patent Application No. 201880097527.7, dated Jun. 1, 2023, with an English translation.

(Continued)

*Primary Examiner* — Phuongchau Ba Nguyen
(74) *Attorney, Agent, or Firm* — Myers Wolin, LLC

(57) ABSTRACT

A base station device includes: a processor that executes a process including generating a first data channel, generating a control channel that includes allocation information on the first data channel, group identifying information for identifying a group of data channel and control information that instructs to collectively feed back an acknowledgement related to the first data channel together with an acknowledgement related to a second data channel that belongs to a same group as the first data channel and that is transmitted after the first data channel, and judging whether a frequency band for which a license is not needed to use in wireless communication is being used by another device; and a transmitter that transmits, when it is judged that the frequency band is not being used, the first data channel and the control channel by using the frequency band.

5 Claims, 9 Drawing Sheets

(51) Int. Cl.
 *H04W 16/14* (2009.01)
 *H04W 72/23* (2023.01)
(58) Field of Classification Search
 CPC . H04W 74/0808; H04W 88/08; H04W 72/04; H04W 72/042; H04W 28/08; H04W 28/084; H04W 36/22; H04W 72/12; H04L 1/1887; H04L 1/1896; H04L 1/1854; H04L 1/1812; H04L 5/0007
 See application file for complete search history.

(56) References Cited

U.S. PATENT DOCUMENTS

| | | |
|---|---|---|
| 2015/0049709 A1 | 2/2015 | Damnjanovic et al. |
| 2017/0310431 A1* | 10/2017 | Iyer ........................ H04L 1/1864 |
| 2019/0159251 A1 | 5/2019 | Li et al. |
| 2019/0334691 A1* | 10/2019 | Bendlin ................ H04L 5/1469 |
| 2020/0059920 A1* | 2/2020 | Berggren .............. H04L 1/1896 |
| 2020/0413442 A1* | 12/2020 | Balasubramanian ........................ H04L 1/1854 |
| 2021/0194740 A1* | 6/2021 | Aldana ............. H04W 72/1215 |

FOREIGN PATENT DOCUMENTS

| | | |
|---|---|---|
| KR | 10-2016-0042953 A | 4/2016 |
| WO | 2018/050205 A1 | 3/2018 |
| WO | 2018/062459 A1 | 4/2018 |

OTHER PUBLICATIONS

Extended European search report with supplementary European search report and the European search opinion ssued by the European Patent Office for corresponding European Patent Application No. 18934621.6-1205, dated Sep. 14, 2021.
LG Electronics, "PUCCH design in LAA", Agenda Item: 7.3.1.3, 3GPP TSG-RAN WG1 Meeting #84bis, R1-162469, Busan, Korea, Apr. 11-15, 2016.
Notice of Reasons for Refusal issued by the Japan Patent Office for corresponding Japanese Patent Application No. 2020-547737, dated Dec. 13, 2022, with an English translation.
Notice of Preliminary Rejection issued by the Korean Intellectual Property Office for corresponding Korean Patent Application No. 10-2021-7008234, dated Mar. 4, 2022, with an English translation.
Qualcomm Incorporated, "Enhancements to Scheduling and HARQ operation for NR-U", Agenda Item: 7.2.2.4.3, 3GPP TSG-RAN WG1 Meeting #94, R1-1809481, Gothenburg, Sweden, Aug. 20-24, 2018.
Communication pursuant to Article 94(3)EPC issued by the European Patent Office for corresponding European Patent Application No. 18 934 621.6-1213, dated Feb. 24, 2023.
3GPP TS 36.211 V15.2.0, "3rd Generation Partnership Project, Technical Specification Group Radio Access Network; Evolved Universal Terrestrial Radio Access (E-UTRA); Physical channels and modulation (Release 15)", Jun. 2018.
3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.
3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.
3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.
3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)", Jul. 2018.
3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.
3GPP TS 36.323 V15.0.0, "3rd Generation Partnership Project; Technical Specification Group Radio Access Network; Evolved Universal Terrestrial Radio Access (E-UTRA); Packet Data Convergence Protocol (PDCP) specification Release 15)", Jul. 2018.
3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.
3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.
3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.
3GPP TS 38.201 V15.0.0, "3rd Generation Partnership Project; Technical Specification Group Radio Access Network; NR; Physical layer, General description (Release 15)", Dec. 2017.
3GPP TS 38.202 V15.2.0, "3rd Generation Partnership Project; Technical Specification Group Radio Access Network; NR; Services provided by the physical layer (Release 15)", Jun. 2018.
3GPP TS 38.211 V15.2.0, "3rd Generation Partnership Project; Technical Specification Group Radio Access Network; NR; Physical channels and modulation (Release 15)", Jun. 2018.
3GPP TS 38.212 V15.2.0, "3rd Generation Partnership Project; Technical Specification Group Radio Access Network; NR; Multiplexing and channel coding (Release 15)", Jun. 2018.
3GPP TS 38.213 V15.2.0, "3rd Generation Partnership Project; Technical Specification Group Radio Access Network; NR; Physical layer procedures for control (Release 15)", Jun. 2018.
3GPP TS 38.214 V15.2.0, "3rd Generation Partnership Project; Technical Specification Group Radio Access Network; NR; Physical layer procedures for data (Release 15)", Jun. 2018.
3GPP TS 38.215 V15.2.0, "3rd Generation Partnership Project; Technical Specification Group Radio Access Network; NR; Physical layer measurements (Release 15)", Jun. 2018.
3GPP TS 38.300 V15.2.0, "3rd Generation Partnership Project; Technical Specification Group Radio Access Network; NR; NR and NG-RAN Overall Description; Stage 2 (Release 15)", Jun. 2018.
3GPP TS 38.321 V15.2.0, "3rd Generation Partnership Project; Technical Specification Group Radio Access Network; NR; Medium Access Control (MAC) protocol specification (Release 15)", Jun. 2018.
3GPP TS 38.322 V15.2.0, "3rd Generation Partnership Project; Technical Specification Group Radio Access Network; NR; Radio Link Control (RLC) protocol specification (Release 15)", Jun. 2018.
3GPP TS 38.323 V15.2.0, "3rd Generation Partnership Project; Technical Specification Group Radio Access Network; NR; Packet Data Convergence Protocol (PDCP) specification (Release 15)", Jun. 2018.
3GPP TS 38.331 V15.2.1, "3rd Generation Partnership Project; Technical Specification Group Radio Access Network; NR; Radio Resource Control (RRC) protocol specification (Release 15)", Jun. 2018.
3GPP TS 38.401 V15.2.0, "3rd Generation Partnership Project; Technical Specification Group Radio Access Network; NG-RAN; Architecture description (Release 15)", Jun. 2018.

(56) References Cited

OTHER PUBLICATIONS

3GPP TS 38.410 V15.0.0, "3rd Generation Partnership Project; Technical Specification Group Radio Access Network; NG-RAN; NG general aspects and principles (Release 15)", Jun. 2018.
3GPP TS 38.413 V15.0.0, "3rd Generation Partnership Project; Technical Specification Group Radio Access Network; NG-RAN; NG Application Protocol (NGAP) (Release 15)", Jun. 2018.
3GPP TS 38.420 V15.0.0, "3rd Generation Partnership Project; Technical Specification Group Radio Access Network; NG-RAN; Xn general aspects and principles (Release 15)", Jun. 2018.
3GPP TS 38.423 V15.0.0, "3rd Generation Partnership Project; Technical Specification Group Radio Access Network; NG-RAN; Xn application protocol (XnAP) (Release 15)", Jun. 2018.
3GPP TS 38.470 V15.2.0, "3rd Generation Partnership Project; Technical Specification Group Radio Access Network; NG-RAN; F1 general aspects and principles (Release 15)", Jun. 2018.
3GPP TS 38.473 V15.2.1, "3rd Generation Partnership Project; Technical Specification Group Radio Access Network; NG-RAN; F1 application protocol (F1AP) (Release 15)", Jul. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V15.0.0, "3rd Generation Partnership Project; Technical Specification Group Radio Access Network; Study on channel model for frequency spectrum above 6 GHz (Release 15)", Jun. 2018.
3GPP TR 38.912 V15.0.0, "3rd Generation Partnership Project; Technical Specification Group Radio Access Network; Study on New Radio (NR) access technology (Release 15)", Jun. 2018.
3GPP TR 38.913 V15.0.0, "3rd Generation Partnership Project; Technical Specification Group Radio Access Network; Study on Scenarios and Requirements for Next Generation Access Technologies; (Release 15)", Jun. 2018.
Spreadtrum Communications, "Consideration on HARQ enhancements in NR-U", Agenda Item: 7.2.2.4.3, 3GPP TSG-RAN WG1 Meeting #94, R1-1808811, Gothenburg, Sweden, Aug. 20-24, 2018.
Qualcomm Incorporated, "Remaining Issues on DL/UL Scheduling, Processing Time and HARQ management", Agenda Item: 7.1.3.3.2, 3GPP TSG-RAN WG1 Meeting #92, 1802842, Athens, Greece, Feb. 26-Mar. 2, 2018.
Zte et al., "Framework on potential solutions and techniques for NR-U", Agenda Item: 7.6.4, 3GPP TSG-RAN WG1 Meeting #92, R1-1801466, Athens, Greece, Feb. 26-Mar. 2, 2018.
Nokia et al., "HARQ enhancements for NR unlicensed", Agenda Item: 7.6.4.3, 3GPP TSG-RAN WG1 Meeting #93, R1-1806110, Busan, Korea, May 21-25, 2018.
Oppo, "HARQ enhancements for NR-U", Agenda Item: 7.2.2.4.3, 3GPP TSG-RAN WG1 Meeting #94, R1-1808895, Gothenburg, Sweden, Aug. 20-24, 2018.
International Search Report and Written Opinion of the International Searching Authority issued by the Japan Patent Office for corresponding International Patent Application No. PCT/JP2018/036015, dated Dec. 25, 2018, with an English translation.

\* cited by examiner

FIG.6

| SLOT | #0 | #1 | #2 | #3 | #4 | #5 | #6 |
|---|---|---|---|---|---|---|---|
| FB TIMING INFORMATION | 0101 | 0100 | 0011 | 0010 | 0001 | 1111 | 1111 |
| COUNTER DAI | 00 | 01 | 10 | 11 | 00 | 00 | 01 |

FIG.7

| FB TIMING INFORMATION | NUMBER OF SLOTS |
|---|---|
| 0000 | AFTER 2 SLOTS |
| 0001 | AFTER 3 SLOTS |
| 0010 | AFTER 4 SLOTS |
| 0011 | AFTER 5 SLOTS |
| 0100 | AFTER 6 SLOTS |
| 0101 | AFTER 7 SLOTS |
| 0110 | AFTER 8 SLOTS |
| 0111 | AFTER 9 SLOTS |
| 1000 | AFTER 10 SLOTS |
| 1001 | AFTER 11 SLOTS |
| 1010 | AFTER 12 SLOTS |
| 1011 | AFTER 13 SLOTS |
| 1100 | AFTER 14 SLOTS |
| 1101 | AFTER 15 SLOTS |
| 1110 | AFTER 16 SLOTS |
| 1111 | NEXT BURST |

FIG.8

| SLOT | #0 | #1 | #2 | #3 | #4 | #5 | #6 |
|---|---|---|---|---|---|---|---|
| WINDOW ID | 0 | 0 | 0 | 0 | 0 | 1 | 1 |
| FB TIMING INFORMATION | 0101 | 0100 | 0011 | 0010 | 0001 | 1111 | 1111 |
| COUNTER DAI | 00 | 01 | 10 | 11 | 00 | 00 | 01 |

FIG.9

| FB TIMING INFORMATION | NUMBER OF SLOTS |
|---|---|
| 0000 | AFTER 2 SLOTS |
| 0001 | AFTER 3 SLOTS |
| 0010 | AFTER 4 SLOTS |
| 0011 | AFTER 5 SLOTS |
| 0100 | AFTER 6 SLOTS |
| 0101 | AFTER 7 SLOTS |
| 0110 | AFTER 8 SLOTS |
| 0111 | AFTER 9 SLOTS |
| 1000 | AFTER 10 SLOTS |
| 1001 | AFTER 11 SLOTS |
| 1010 | AFTER 12 SLOTS |
| 1011 | AFTER 13 SLOTS |
| 1100 | AFTER 14 SLOTS |
| 1101 | AFTER 15 SLOTS |
| 1110 | AFTER 16 SLOTS |
| 1111 | N/A |

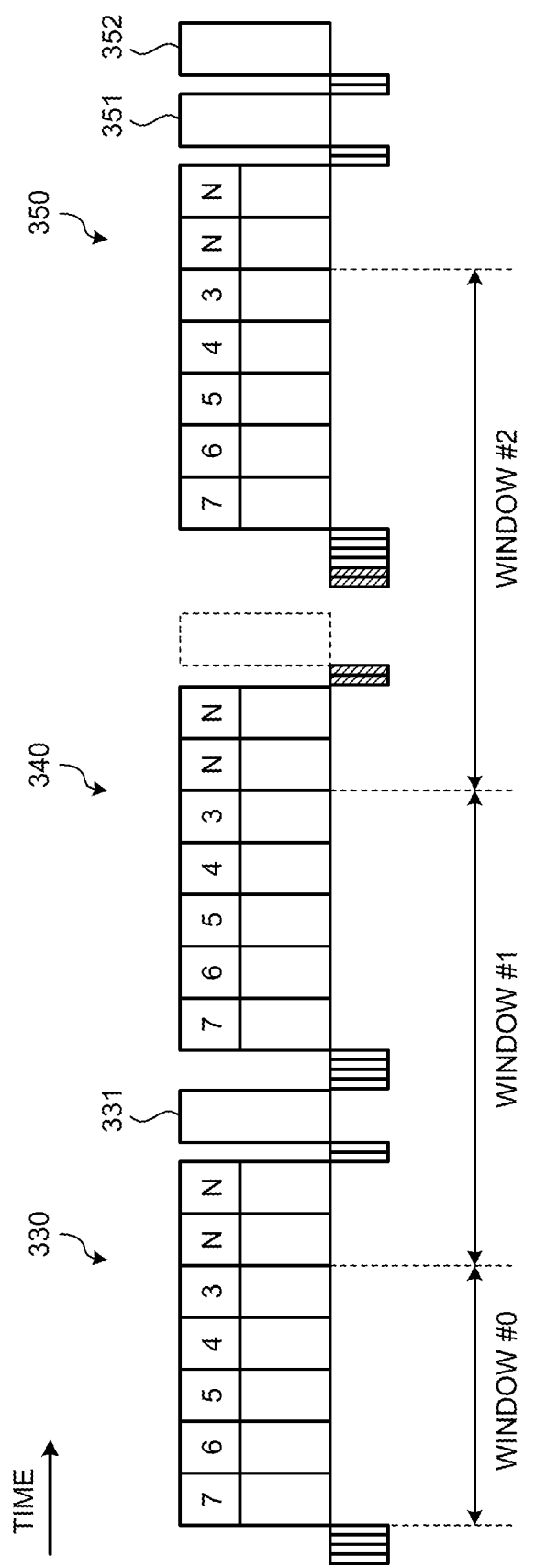

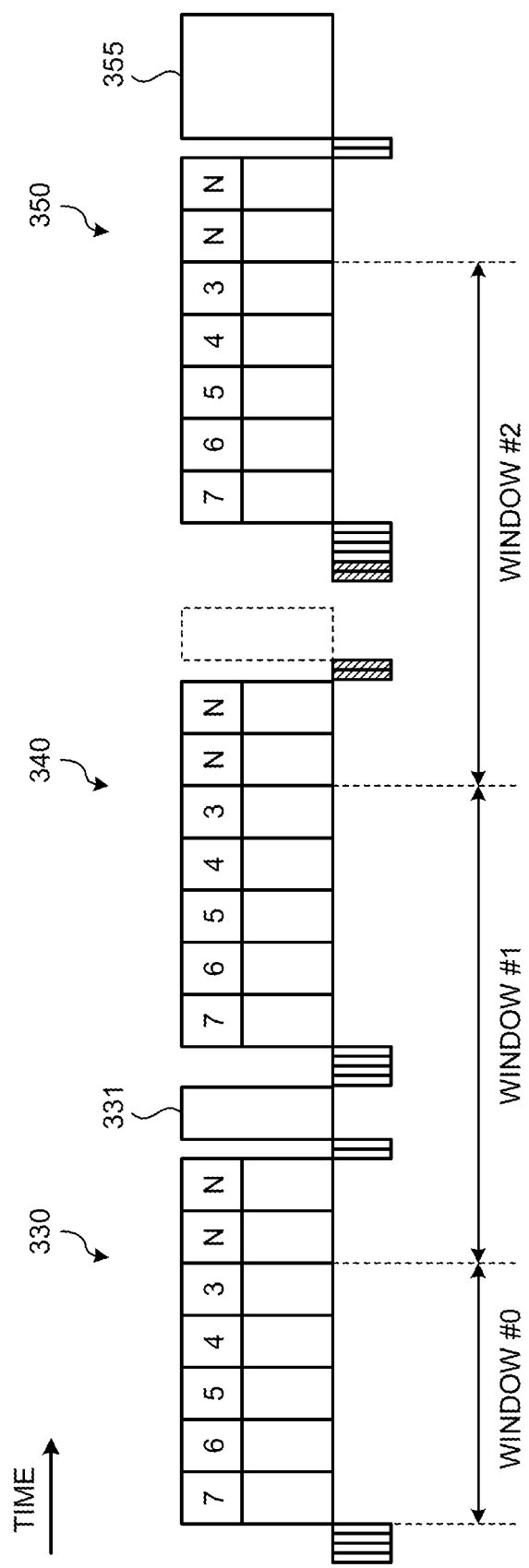

BASE STATION DEVICE, TERMINAL DEVICE, AND WIRELESS COMMUNICATION SYSTEM

CROSS-REFERENCE TO RELATED APPLICATION

This application is a continuation of International Application No. PCT/JP2018/036015, filed on Sep. 27, 2018 and designating the U.S., the entire contents of which are incorporated herein by reference.

FIELD

The present invention relates to a base station device, a terminal device, and a wireless communication system.

BACKGROUND

In the current networks, traffic of mobile terminals (smartphones and feature phones) occupies most of network resources. Furthermore, traffic used by mobile terminals tends to be continuously increased in the future.

In contrast, with the development of Internet of things (IoT) services (for example, transportation systems, smart meters, monitoring systems for devices, and the like), there is a demand for coping with services having various requirements. Thus, in the communication standards for the fifth generation mobile communication (5G or New Radio (NR)), in addition to the standard technologies (for example, Non Patent Literatures 1 to 11) of the fourth generation mobile communication (4G), there is a demand for a technology that implements high-data-rate, high-capacity, and low-latency communication. Furthermore, regarding the fifth generation communication standards, technical studies are being conducted in 3GPP working groups (for example, TSG-RAN WG1, TSG-RAN WG2, and the like) (Non Patent Literatures 12 to 38).

Furthermore, in a wireless communication system (for example, long term evolution (LTE) or 5G), a technology of hybrid automatic repeat request (HARQ) is used to implement efficient data transmission. In HARQ, a receiving device requests a transmitting device to retransmit data that is not correctly decoded in a process performed in a protocol hierarchy of, for example, layer 1 in LTE or the like. When the transmitting device is requested to retransmit the data, the transmitting device transmits the retransmission data associated with the retransmission request. In the receiving device, data is decoded by combining the original data that is not correctly decoded with the retransmission data. Consequently, high efficiency and high accuracy retransmission control is implemented.

Transmission timing of feedback of HARQ is designated by, for example, control information. Namely, timing at which an ACK or a NACK with respect to downlink data is fed back is designated by information in DCI format 1_0 transmitted by, for example, a physical downlink control channel (PDCCH) that is a control channel for a downlink. The timing of the feedback is designated by the number of slots from, for example, the slot in which the data is transmitted to the slot in which an ACK or a NACK is transmitted.

Non Patent Literature 1: 3GPP TS 36.211 V15.2.0 (2018-June)
Non Patent Literature 2: 3GPP TS 36.212 V15.2.1 (2018-July)
Non Patent Literature 3: 3GPP TS 36.213 V15.2.0 (2018-June)
Non Patent Literature 4: 3GPP TS 36.300 V15.2.0 (2018-June)
Non Patent Literature 5: 3GPP TS 36.321 V15.2.0 (2018-July)
Non Patent Literature 6: 3GPP TS 36.322 V15.1.0 (2018-July)
Non Patent Literature 7: 3GPP TS 36.323 V15.0.0 (2018-July)
Non Patent Literature 8: 3GPP TS 36.331 V15.2.2 (2018-June)
Non Patent Literature 9: 3GPP TS 36.413 V15.2.0 (2018-June)
Non Patent Literature 10: 3GPP TS 36.423 V15.2.0 (2018-June)
Non Patent Literature 11: 3GPP TS 36.425 V15.0.0 (2018-June)
Non Patent Literature 12: 3GPP TS 37.340 V15.2.0 (2018-June)
Non Patent Literature 13: 3GPP TS 38.201 V15.0.0 (2017-December)
Non Patent Literature 14: 3GPP TS 38.202 V15.2.0 (2018-June)
Non Patent Literature 15: 3GPP TS 38.211 V15.2.0 (2018-June)
Non Patent Literature 16: 3GPP TS 38.212 V15.2.0 (2018-June)
Non Patent Literature 17: 3GPP TS 38.213 V15.2.0 (2018-June)
Non Patent Literature 18: 3GPP TS 38.214 V15.2.0 (2018-June)
Non Patent Literature 19: 3GPP TS 38.215 V15.2.0 (2018-June)
Non Patent Literature 20: 3GPP TS 38.300 V15.2.0 (2018-June)
Non Patent Literature 21: 3GPP TS 38.321 V15.2.0 (2018-June)
Non Patent Literature 22: 3GPP TS 38.322 V15.2.0 (2018-June)
Non Patent Literature 23: 3GPP TS 38.323 V15.2.0 (2018-June)
Non Patent Literature 24: 3GPP TS 38.331 V15.2.1 (2018-June)
Non Patent Literature 25: 3GPP TS 38.401 V15.2.0 (2018-June)
Non Patent Literature 26: 3GPP TS 38.410 V15.0.0 (2018-June)
Non Patent Literature 27: 3GPP TS 38.413 V15.0.0 (2018-June)
Non Patent Literature 28: 3GPP TS 38.420 V15.0.0 (2018-June)
Non Patent Literature 29: 3GPP TS 38.423 V15.0.0 (2018-June)
Non Patent Literature 30: 3GPP TS 38.470 V15.2.0 (2018-June)
Non Patent Literature 31: 3GPP TS 38.473 V15.2.1 (2018-July)
Non Patent Literature 32: 3GPP TR 38.801 V14.0.0 (2017-March)
Non Patent Literature 33: 3GPP TR 38.802 V14.2.0 (2017-September)
Non Patent Literature 34: 3GPP TR 38.803 V14.2.0 (2017-September)
Non Patent Literature 35: 3GPP TR 38.804 V14.0.0 (2017-March)

Non Patent Literature 36: 3GPP TR 38.900 V15.0.0 (2018-June)

Non Patent Literature 37: 3GPP TR 38.912 V15.0.0 (2018-June)

Non Patent Literature 38: 3GPP TR 38.913 V15.0.0 (2018-June)

Incidentally, HARQ is not only applicable to communication that uses a licensed band (hereinafter, simply referred to as an "L band") for which a license is needed to use in wireless communication, but also applicable to communication that uses an unlicensed band (hereinafter, simply referred to as a "U band") for which a license is not needed to use in wireless communication. In general, because the U band is shared by a plurality of wireless communication systems, interference between wireless communication systems may possibly occur in communication performed by the U band. Thus, when communication is performed by using the U band, a listen before talk (LBT) process is performed before a signal is transmitted, and the signal is transmitted when transmission is not performed by another device and the U band is idle. In contrast, transmission of a signal is suspended when transmission is performed by the other device and the U band is busy.

However, there is a problem in that, when HARQ is used in the U band, transmission efficiency is decreased. Specifically, for example, when a burst containing a plurality of consecutive slots is transmitted by using the U band, the feedback timing of an ACK or a NACK with respect to data in each of the slots included in the burst is designated by control information. Consequently, an ACK or a NACK is transmitted by the designated feedback timing. Accordingly, because the U band is used to transmit an ACK or a NACK at the feedback timing, another transmission using the U band is not performed.

In contrast, an LBT process is performed before the next burst is transmitted and, when the U band becomes idle, burst transmission is performed. Consequently, for example, if a period of time in which the U band is busy continues, there may be a case in which the execution timing of the next burst transmission and the feedback timing described above are overlapped. In this case, a part of the burst is transmitted before the feedback timing and the rest part of the burst is transmitted after the LBT process is again performed after the feedback timing.

As a result, transmission of the data is intermittent and the number of times of the LBT processes is increased, whereby the transmission efficiency of data is decreased. In other words, continuous transmission of burst is limited due to feedback of the ACK or the NACK and throughput is thus decreased.

SUMMARY

According to an aspect of an embodiment of the invention, a base station device includes: a processor that executes a process including generating a first data channel, generating a control channel that includes allocation information on the first data channel, group identifying information for identifying a group of data channel and control information that instructs to collectively feed back an acknowledgement related to the first data channel together with an acknowledgement related to a second data channel that belongs to a same group as the first data channel and that is transmitted after the first data channel, and judging whether a frequency band for which a license is not needed to use in wireless communication is being used by another device; and a transmitter that transmits, when it is judged that the frequency band is not being used, the first data channel and the control channel by using the frequency band.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a diagram illustrating a specific example of control information for each slot;

FIG. 7 is a diagram illustrating an association relationship between FB timing information and the number of slots;

FIG. 8 is a diagram illustrating another specific example of control information for each slot;

FIG. 9 is a diagram illustrating another association relationship between FB timing information and the number of slots;

FIG. 10 is a diagram illustrating another specific example of a transmission status of a U band; and FIG. 11 is a diagram illustrating still another specific example of a transmission status using the U band.

DESCRIPTION OF EMBODIMENTS

Preferred embodiments of the present invention will be explained with reference to accompanying drawings. Furthermore, the present invention is not limited to the embodiments.

Figure 1:
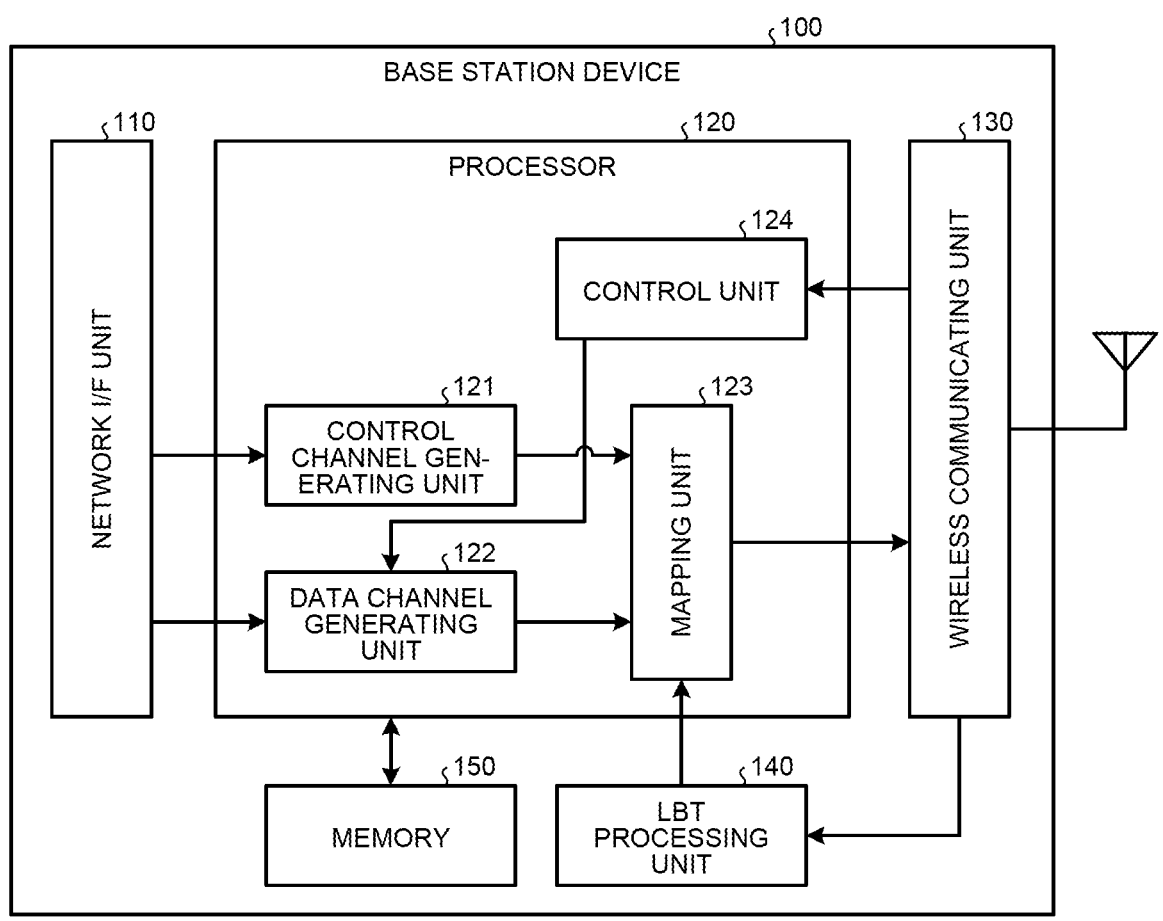
FIG. 1 is a block diagram illustrating a configuration of a base station device according to an embodiment.

FIG. 1 is a block diagram illustrating a configuration of a base station device 100 according to an embodiment. The base station device 100 performs transmission using a U band. The base station device 100 illustrated in FIG. 1 includes a network interface unit (hereinafter, simply referred to as a "network I/F unit") 110, a processor 120, a wireless communicating unit 130, a LBT processing unit 140, and a memory 150. In FIG. 1, only the processing units related to transmission performed by using a U band is illustrated; however, the base station device 100 may also perform transmission by using not only the U band but also an L band.

The network I/F unit 110 is an interface that is connected to a communication device constituting, for example, a core network or that is connected to another base station device. The network I/F unit 110 receives information that is needed to generate a signal of a control channel or information that is needed to generate a signal of a data channel from the communication device that constitutes a core network.

The processor 120 includes, for example, a central processing unit (CPU), a field programmable gate array (FPGA) or a digital signal processor (DSP), and performs overall control of the base station device 100. Specifically, the processor 120 includes a control channel generating unit 121, a data channel generating unit 122, a mapping unit 123, and a control unit 124.

When burst transmission using the U band is performed, the control channel generating unit 121 generates a control channel of each of a plurality of slots included in the burst. Specifically, the control channel generating unit 121 generates, for each slot, a control channel that includes allocation information on a wireless resource including one or both of the frequency domain and the time domain, modulation scheme, and an encoding rate with respect to a data channel of each of the slots and that includes information (hereinafter, simply referred to as a "FB timing information") that designates feedback timing of an ACK or a NACK with respect to the data channel of each of the slots.

Here, the control channel may also designate, by including information related to the number of transport blocks (TBs) of data included in each of the slots, to generate an ACK or a NACK in units of TBs. Furthermore, the control channel may also designate, by including information related to the number of code block groups (CBGs) constituting the TB, to generate an ACK or a NACK in units of CBGs. When an ACK or a NACK associated with each of the plurality of TBs or CBGs is fed back, a retransmission process is performed in units of feedback of the ACKs or the NACKs. In a description below, a description will be given with the assumption that a single TB is transmitted per slot and the ACK or the NACK are fed back in units of TBs. In a case in which a plurality of TBs or CBGs are transmitted per slot and a plurality of ACKs or NACKs are fed back, in a description below, for example, "a slot" described in the "a slot associated with a NACK" may also be replaced with "a TB" or "a CBG".

At this time, regarding a predetermined number of slots from the top of a burst, the control channel generating unit 121 includes FB timing information indicating the number of slots from each of the slots to the feedback timing in the control channel. Namely, regarding the predetermined number of slots from the top of the burst, the control channel generating unit 121 generates, for each slot, the FB timing information that designates a common slot located after the end of the burst transmission as a feedback timing. Furthermore, regarding the rearward slots except for the predetermined number of slots from the top of the burst, the control channel generating unit 121 includes, in the control channel, the FB timing information that instructs to transmit ACKs or NACKs at the same time of the feedback with respect to the next burst. Namely, regarding the rearward slots in the burst, the control channel generating unit 121 generates FB timing information that instructs to collectively feed back the ACKs or the NACKs together with a next burst without specifying the slots that are used to feed back the ACKs or the NACKs.

When the burst transmission using the U band is performed, the data channel generating unit 122 generates a data channel of each of the plurality of slots included in a burst. Specifically, the data channel generating unit 122 generates, for each slot, a data channel including transmission data.

The mapping unit 123 generates the burst by mapping both of the control channel generated by the control channel generating unit 121 and the data channels generated by the data channel generating unit 122 onto the plurality of slots. Then, the mapping unit 123 temporarily holds the generated burst and transmits the burst from the wireless communicating unit 130 at the timing instructed by the LBT processing unit 140.

When a code book including the ACK or the NACK for each slot is received by the wireless communicating unit 130, the control unit 124 instructs the data channel generating unit 122 to generate transmission data of the slot associated with the NACK and retransmit the transmission data via the mapping unit 123. Namely, because, in the code book, both of an ACK related to the slot that is correctly decoded in the terminal device that is the transmission destination of the burst and a NACK related to the slot that is not correctly decoded are included, the control unit 124 performs retransmission control of the transmission data of the slot that is associated with the NACK.

The wireless communicating unit 130 performs a predetermined wireless transmission process, such as digital/analog (D/A) conversion and up-conversion, on the transmission data or the retransmission data output from the mapping unit 123, and then, transmits the processed data via an antenna. Furthermore, the wireless communicating unit 130 receives the code book including the ACK or the NACK for each slot and performs predetermined wireless reception processes, such as down-conversion and analog/digital (A/D) conversion.

The LBT processing unit 140 performs the LBT process on the U band via the wireless communicating unit 130. Namely, the LBT processing unit 140 judges, by measuring received power of the U band, whether the other device transmits a signal by using the U band. Then, when the received power of the U band is greater than or equal to a predetermined threshold, the LBT processing unit 140 judges that the other device is transmitting a signal and the U band is busy, whereas, when the received power of the U band is less than the predetermined threshold, the LBT processing unit 140 judges that the other device is not transmitting the signal and the U band is idle. When the U band is idle, the LBT processing unit 140 instructs the mapping unit 123 to transmit the transmission data or the retransmission data.

The memory 150 includes, for example, a random access memory (RAM) or a read only memory (ROM), or the like and stores information that is used by the processor 120 to perform processes.

Figure 2:
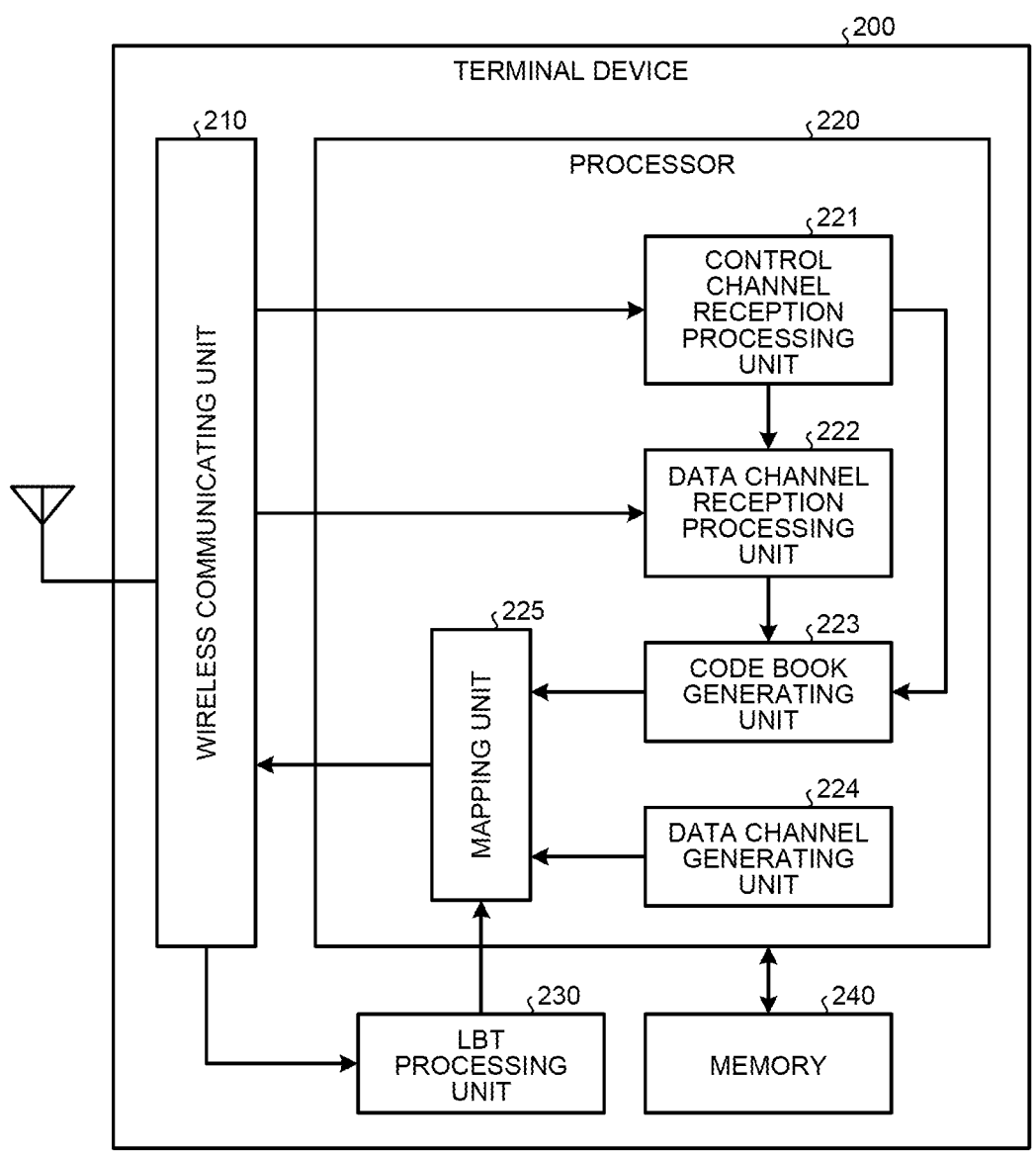
FIG. 2 is a block diagram illustrating a configuration of a terminal device according to the embodiment.

FIG. 2 is a block diagram illustrating a configuration of a terminal device 200 according to an embodiment. The terminal device 200 receives a signal in the U band and transmits ACKs or NACKs. The terminal device 200 illustrated in FIG. 2 includes a wireless communicating unit 210, a processor 220, a LBT processing unit 230, and a memory 240. In FIG. 2, only the processing units related to performing communication using the U band are illustrated; however, the terminal device 200 may also perform communication not only using the U band, but also using the L band.

The wireless communicating unit 210 receives a signal in the U band transmitted from the base station device 100 and performs the predetermined wireless reception processes, such as down-conversion and A/D conversion, on the received signal. Furthermore, the wireless communicating unit 210 performs predetermined wireless transmission processes, such as D/A conversion and up-conversion, on the code book that includes the ACKs or the NACKs related to the received signal and transmits the processed data via the antenna.

The processor 220 includes, for example, a CPU, an FPGA, a DSP, or the like and performs overall control of the terminal device 200. Specifically, the processor 220 includes a control channel reception processing unit 221, a data channel reception processing unit 222, a code book generating unit 223, a data channel generating unit 224, and a mapping unit 225.

The control channel reception processing unit 221 demodulates and decodes the control channel in each of the slots in the received signal in the U band. Then, the control channel reception processing unit 221 outputs the allocation information included in the control channel to the data channel reception processing unit 222 and outputs the FB timing information to the code book generating unit 223.

The data channel reception processing unit 222 demodulates and decodes a data channel in each of the slots in the received signal in the U band in accordance with the allocation information. Namely, because the allocation information output from the control channel reception processing unit 221 includes information, such as a modulation scheme and an encoding rate of a data channel, the data channel reception processing unit 222 performs the reception process on the data channel by referring to the allocation information. Then, the data channel reception processing unit 222 notifies the code book generating unit 223 of the status indicating whether the data channel for each slot has been correctly decoded. Namely, the data channel reception processing unit 222 notifies the code book generating unit 223 of the decoding judgement result of, for example, for each slot.

The code book generating unit 223 generates, for each slot, an ACK or a NACK indicating a decoding result of the data channels and generates a code book including the ACKs or the NACKs of the plurality of slots. At this time, the code book generating unit 223 generates the code book associated with the plurality of slots that are instructed to feed back the ACKs or the NACKs by using the common slot in accordance with the FB timing information. Accordingly, the code book generating unit 223 generates the code book including the ACKs or the NACKs related to a predetermined number of slots from the top of a single burst. Then, the code book generating unit 223 temporarily holds the ACKs or the NACK related to the rearward slots in the burst and generates, when the next burst is received, a code book that includes both of the ACKs or the NACKs that are being held and the ACKs or the NACKs that are associated with the next burst. In other words, regarding the slots that are instructed by the FB timing information to collectively feed back the ACKs or the NACKs together with the next burst, the code book generating unit 223 generates another code book when the next burst is received.

In this way, the code book generating unit 223 collectively generates the code book related to the rearward slots in the burst together with the next burst, and the reason for this is as follows. Namely, a certain amount of processing time is needed for the data channel reception processing unit 222 to perform the reception process on the data channel for each slot and needed for the code book generating unit 223 to generate a code book. Consequently, it is difficult to feed back, to the base station device 100, the code book including the ACKs or the NACKs related to the rearward slots in the burst immediately after the completion of the reception of the entirety of the burst. In contrast, regarding the predetermined number of slots from the top of the burst, it is possible to generate ACKs or NACKs during reception of the rearward slots in the burst and it is possible to feed back, to the base station device 100, the code book including these ACKs or NACKs immediately after the completion of the entirety of the burst.

Thus, regarding the predetermined number of slots from the top of the burst, the FB timing information specifies the slots located immediately after the completion of the reception of the entirety of the burst as the slots for feeding back of ACKs or NACKs. Consequently, the code book generating unit 223 generates a code book including the ACKs or the NACKs related to the predetermined number of slots from the top of the burst. In contrast, regarding the rearward slots in the burst, the FB timing information designates to collectively feed back ACKs or NACKs together with the next burst. Consequently, the code book generating unit 223 holds the ACK or the NACK related to the rearward slots in the burst until the next burst is received, and then, collectively generates a code book together with the ACKs or the NACKs related to the next burst.

The data channel generating unit 224 generates a data channel including transmission data when the data channel generating unit 224 transmits data to the base station device 100 by using the U band.

The mapping unit 225 generates a transmission signal in an uplink by mapping both of the code book generated by the code book generating unit 223 and the data channels generated by the data channel generating unit 224. Then, the mapping unit 225 temporarily holds the generated transmission signal and transmits the transmission signal from the wireless communicating unit 210 at the timing instructed by the LBT processing unit 230.

The LBT processing unit 230 performs the LBT process on the U band via the wireless communicating unit 210. Namely, the LBT processing unit 230 judges, by measuring the received power of the U band, whether the other device is transmitting a signal by using the U band. Then, when the received power of the U band is greater than or equal to the predetermined threshold, the LBT processing unit 230 judges that the other device is transmitting the signal and the U band is busy, whereas, when the received power of the U band is less than the predetermined threshold, the LBT processing unit 230 judges that the other device does not currently transmit a signal and the U band is idle. When the U band is idle, the LBT processing unit 230 instructs the mapping unit 225 to transmit the transmission signal.

The memory 240 includes, for example, a RAM, a ROM, or the like and stores information that is used by the processor 220 to execute processes.

Figure 3:
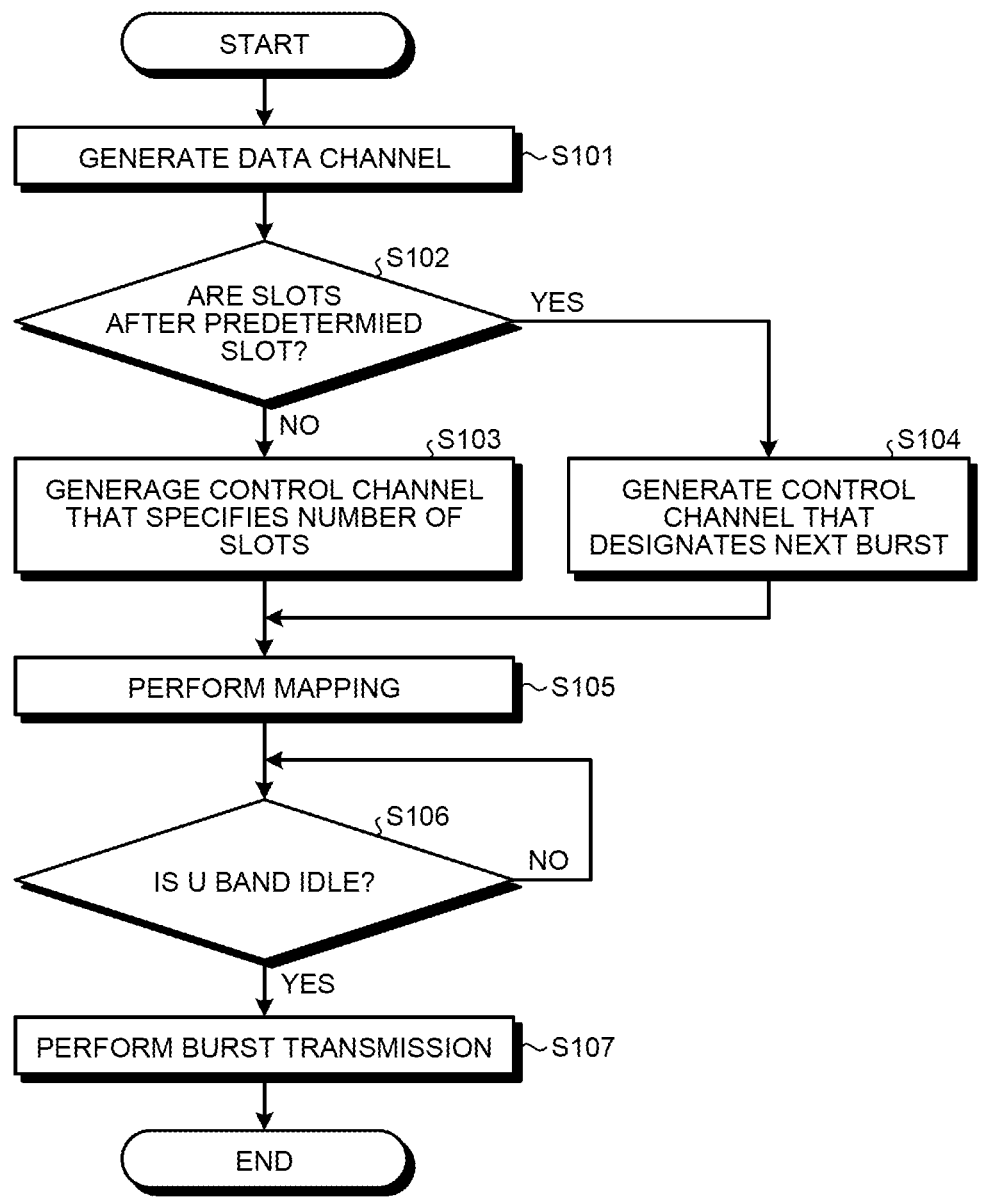
FIG. 3 is a flowchart illustrating the base station device according to the embodiment.

In the following, an operation of the base station device 100 according to an embodiment will be described with reference to the flowchart illustrated in FIG. 3. In a description below, an operation performed in a case in which a burst including a plurality of slots is transmitted from the base station device 100 to the terminal device 200 will be described.

The data transmitted from the base station device 100 to the terminal device 200 is acquired from a core network by, for example, the network I/F unit 110. Then, a data channel is generated, for each slot, from the transmission data obtained from the core network by the data channel generating unit 122 (Step S101).

Furthermore, a control channel that includes allocation information and the FB timing information on the data channel is generated by the control channel generating unit 121 for each slot. Specifically, it is determined whether the individual slots are the slots from the top to the predetermined slot in the burst or whether the individual slots are the slots after the predetermined slot (Step S102). Then, when the target slots are the slots from the top to the predetermined slot in the burst (No at Step S102), the FB timing information that specifies the number of slots up to the feedback timing with respect to the subject slot is generated and the control channel that includes the subject FB timing information is generated (Step S103). At this time, FB timing information that specifies the number of slots up to the slot immediately after, for example, completion of the transmission of the entirety of burst is generated for each slot and is included in the control channel.

In contrast, when the target slots are the slots after the predetermined slot in the burst (Yes at Step S102), the FB timing information designating that the feedback timing with respect to the subject slots is the same as that of the feedback with respect to the next burst is generated and a control channel that includes the subject FB timing information is generated (Step S104).

In this way, from among the plurality of slots included in a single burst, regarding the predetermined number of slots from the top, the FB timing information that specifies the common slot as the feedback timing of the ACKs or the NACKs is generated. Furthermore, regarding the rearward slots in the burst, the FB timing information that designates, as the feedback timing of the ACKs or the NACKs, to collectively feed back the rearward slots together with the next burst is generated.

The control channel generated by the control channel generating unit 121 and the data channel generated by the data channel generating unit 122 are output to the mapping unit 123 and are mapped onto each of the plurality of slots, and a burst is generated (Step S105). The encoding bits of the transmission data for each slot included in this burst are held by the data channel generating unit 122 in preparation for retransmission.

In a period of time for which the burst is generated, the LBT process is periodically performed by the LBT processing unit 140 and it is judged whether the U band is idle (Step S106). Specifically, it is judges whether the received power of the U band in the wireless communicating unit 130 is greater than or equal to the predetermined threshold, and when the received power is greater than or equal to the predetermined threshold, it is judged, by the LBT processing unit 140, that the U band is busy. When the U band is busy (No at Step S106), the burst is kept on standby until the U band becomes idle, whereas, when the U band becomes idle (Yes at Step S106), the burst is output from the mapping unit 123 to the wireless communicating unit 130. Then, the predetermined wireless transmission process is performed on the burst by the wireless communicating unit 130 and the slots included in the burst are sequentially transmitted from the antenna (Step S107).

Figure 4:
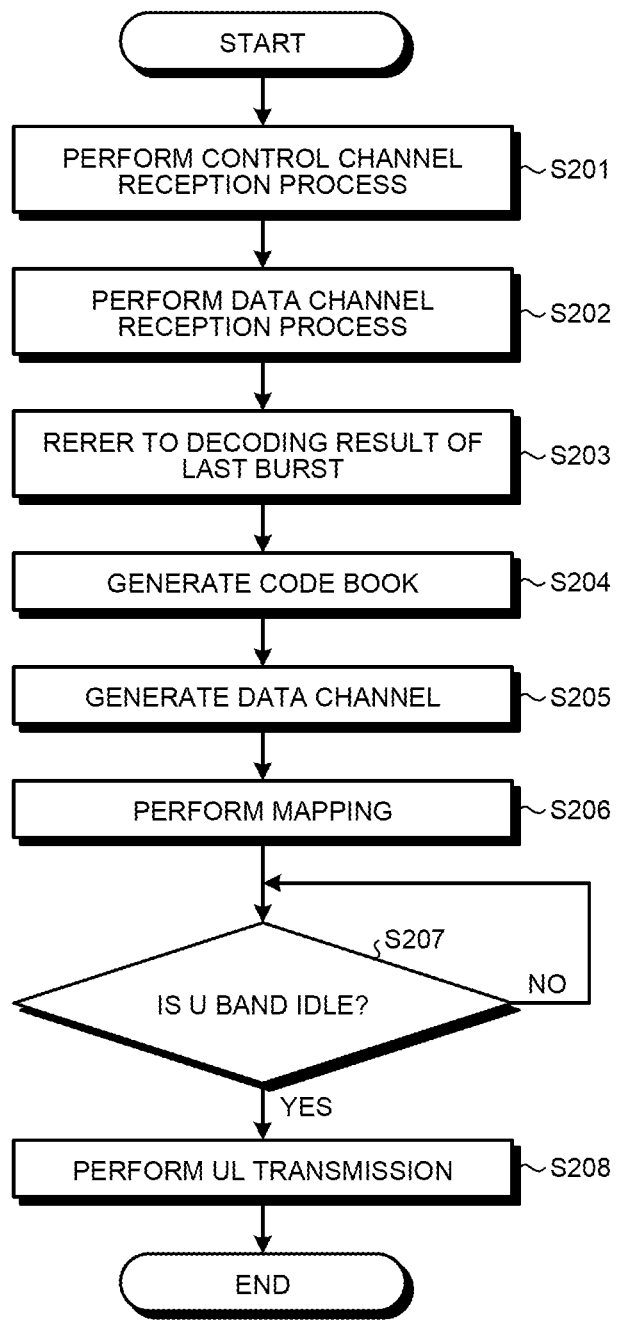
FIG. 4 is a flowchart illustrating an operation of the terminal device according to the embodiment.

In the following, an operation of the terminal device 200 according to an embodiment will be described with reference to the flowchart illustrated in FIG. 4. In a description below, an operation performed in a case in which the terminal device 200 receives a burst transmitted from the base station device 100 will be described.

Each of the slots in the burst transmitted from the base station device 100 is sequentially received by the wireless communicating unit 210, is subjected to the predetermined wireless reception process, and is then output to the control channel reception processing unit 221 and the data channel reception processing unit 222. Then, demodulation and decoding of the control channel of each slot is performed by the control channel reception processing unit 221 (Step S201). Consequently, the allocation information and the FB timing information for each slot are obtained, and then, the allocation information is output to the data channel reception processing unit 222, whereas the FB timing information is output to the code book generating unit 223.

Then, demodulation and decoding of the data channel of each of the slots are performed by the data channel reception processing unit 222 (Step S202). Namely, by referring to the allocation information for each slot, the data channel of each of the slots is demodulated and decoded, and the, information indicating whether the data channel for each slot is correctly coded is sent to the code book generating unit 223 as a notification.

Incidentally, a decoding result related to the rearward slots included in the burst that has been received last time is held in the code book generating unit 223. Namely, from among the slots included in the burst received last time, the ACKs or the NACKs related to the slots designated to be collectively fed back together with the next burst are held. Thus, the decoding result related to the burst received last time is referred to by the code book generating unit 223 (Step S203), and the held ACKs or NACKs related to the last burst are acquired.

Then, a code book that includes the acquired ACKs or NACKs and that includes the ACKs or the NACKs related to the slots specified for feedback by the FB timing information is generated (Step S204). In other words, a code book that includes the ACKs or the NACKs related to the rearward slots in the burst received last time and that includes the ACKs or the NACKs related to the predetermined number of slots located from the top of the burst received this time is generated by the code book generating unit 223. At this time, the ACKs or the NACKs related to the slots that are designated to be fed back together with the next burst by the FB timing information is held by the code book generating unit 223. Namely, the ACKs or the NACKs related to the rearward slots in the burst received this time are held up to the reception time of the next burst.

In this way, because a single code book is generated from the ACKs or the NACKs that are present across a plurality of bursts is generated in accordance with the FB timing information, it is possible to reduce the number of times the ACKs or the NACKs are fed back to the minimum and it is possible to decrease a frequency in which the U band is occupied by feedback of the ACKs or the NACKs. As a result, continuous transmission of the bursts in the downlink is not limited due to feedback of the ACKs or the NACKs, it is thus possible to suppress a decrease in transmission efficiency.

When transmission data to be transmitted to the base station device 100 is present, a data channel in an uplink is generated by the data channel generating unit 224 (Step S205). Both of the code book generated by the code book generating unit 223 and the data channel generated by the data channel generating unit 224 are output to the mapping unit 225 and are mapped onto each of the slots, and then a transmission signal in the uplink is generated (Step S206).

In a period of time for which the transmission signal in the uplink is generated, the LBT process is periodically performed by the LBT processing unit 230 and it is judged whether the U band is idle (Step S207). Specifically, it is judged whether the received power of the U band in the wireless communicating unit 210 is greater than or equal to the predetermined threshold, and, when the received power is greater than or equal to the predetermined threshold, it is judged, by the LBT processing unit 230, that the U band is busy. When the U band is busy (No at Step S207), the burst is kept on standby until the U band becomes idle, whereas, when the U band becomes idle (Yes at Step S207), the transmission signal in the uplink is output from the mapping unit 225 to the wireless communicating unit 210. Then, a predetermined wireless transmission process is subjected to the transmission signal by the wireless communicating unit 210 and the transmission signal in the uplink is transmitted from the antenna (Step S208).

Figure 5:
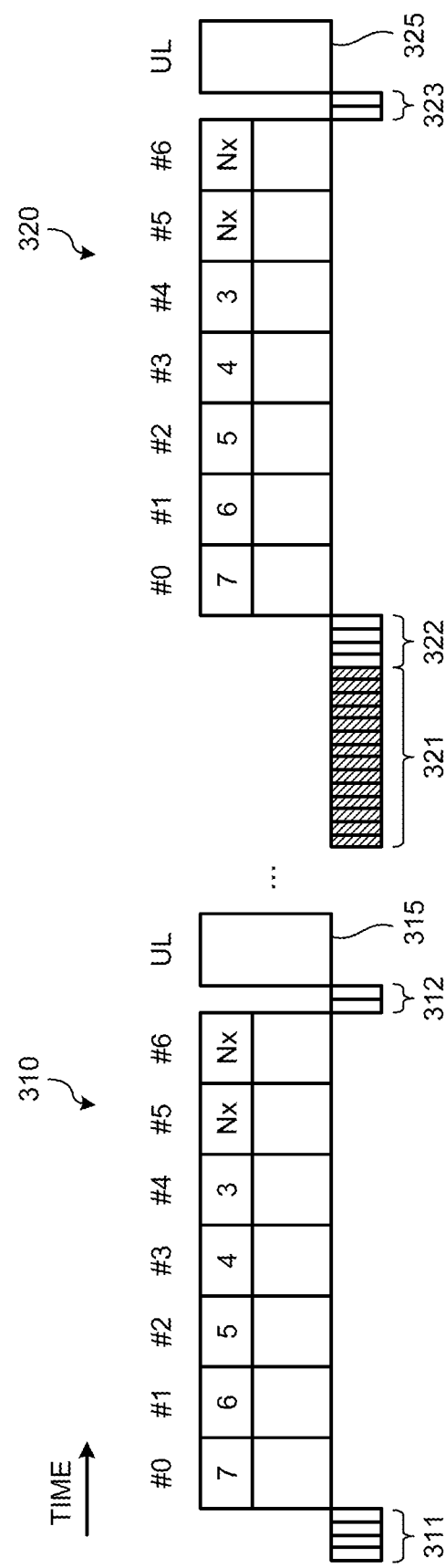
FIG. 5 is a diagram illustrating a specific example of a transmission status using a U band.

In the following, a specific transmission status using by the U band will be described with reference to FIG. 5. FIG. 5 illustrates the transmission status when bursts 310 and 320 are transmitted from the base station device 100 to the terminal device 200 in the U band.

Each of the bursts 310 and 320 includes seven slots of slots #0 to #6. Regarding the slots #0 to #4 included in the bursts 310 and 320, the slot immediately after the burst is specified as the feedback timing. Namely, in the control channel associated with the slots #0 to #4, the FB timing information that specifies the number of slots from each of the slots to the slot immediately after the burst is included. For example, in the control channel associated with the slot #0, the FB timing information that specifies that the feedback timing is seven slots after the slot #0 is included, and, in the control channel associated with the slot #1, FB timing information that specifies that the feedback timing is six slots after the slot #1 is included. FIG. 5 illustrates slot numbers 7 to 3 specified by the FB timing information in the slots #0 to #4, respectively, included in the bursts 310 and 320.

In contrast, regarding the slots #5 to #6 in each of the bursts 310 and 320, these slots are designated to be collectively fed back together with the next burst. Namely, in the control channel associated with the slots #5 to #6, the FB timing information that designates to simultaneously feed back the ACKs or the NACKs together with the ACKs or the NACKs related to the next burst is included. In FIG. 5, FB timing information related to the slots #5 to #6 in each of the bursts 310 and 320 is indicated by "Nx".

As an outcome of the LBT process, when an idle time period 311 of the U band reaches a predetermined length, the base station device 100 transmits the burst 310 in the downlink to the terminal device 200. As described above, in the slots #0 to #4 in the burst 310, FB timing information that specifies the slots immediately after the burst 310 as the feedback timing is included, and, in the slots #5 to #6, the FB timing information that designates to collectively feed back the slots together with the next burst is included.

The terminal device 200 that receives the burst 310 specifies, based on the FB timing information, that the feedback timings of the slots #0 to #4 are the same slot. Then, the terminal device 200 generates a code book that includes the ACKs or the NACKs related to the slots #0 to #4 and, when an idle time period 312 after the reception of the burst 310 reaches a predetermined length, the terminal device 200 sends a code book 315 by using a slot in the uplink specified by the FB timing information associated with the slots #0 to #4. In contrast, because the terminal device 200 determines, based on the FB timing information, that the feedback timing of the slots #5 to #6 is the reception time of the next burst, the terminal device 200 holds the ACKs or the NACKs related to the slots #5 to #6 until the reception time of the next burst.

It is possible to generate the code book including the ACKs or the NACKs related to the slots #0 to #4 during the reception process performed on the slots #5 to #6. Accordingly, it is possible to set the feedback timing related to the slots #0 to #4 in the burst 310 to the slot immediately after the burst 310. Namely, it is possible to promptly perform feedback with respect to the ACKs or the NACKs related to the predetermined number of slots from the top of the burst 310. Furthermore, because the feedback timing is the slot immediately after the burst 310, it is possible to reduce the possibility that feedback is suspended due to busy state in the U band.

The base station device 100 performs the LBT process during a period of time for which the next burst 320 is transmitted, and then, stands by without transmitting the burst 320 in a busy time period 321 of the U band. Then, when an idle time period 322 of the U band reaches the predetermined length, the base station device 100 transmits the burst 320 in the downlink to the terminal device 200. As described above, in the slots #0 to #4 in the burst 320, the FB timing information that specifies the slot immediately after the burst 320 as the feedback timing is included and, in the slots #5 to #6, the FB timing information that designates to feed back the slots together with the next burst is included.

The terminal device 200 that receives the burst 320 specifies, based on the FB timing information, that the feedback timings of the slots #0 to #4 are the same slot. Then, the terminal device 200 obtains the ACKs or the NACKs held at the time of reception of the burst 310 last time and generates a code book that includes these ACKs or NACKs and that includes the ACKs or the NACKs related to the slots #0 to #4 in the burst 320. Namely, the terminal device 200 generates a single code book that includes the ACKs or the NACKs related to the slots #5 to #6 in the burst 310 and that includes the ACKs or the NACKs related to the slots #0 to #4 in the burst 320.

When an idle time period 323 after the reception of the burst 320 reaches the predetermined length, the terminal device 200 transmits a code book 325 by using the slot in the uplink specified by the FB timing information associated with the slots #0 to #4. In the code book 325, not only the ACKs or the NACKs related to the slots #0 to #4 in the burst 320, but also the ACKs or the NACKs related to the slots #5 to #6 in the burst 310 received last time are included. Namely, the ACKs or the NACKs that are present across the two bursts 310 and 320 are fed back by the code book 325 and it is thus possible to reduce the number of times of feedback. As a result, continuous transmission of the bursts in the downlink is not limited due to feedback of the ACKs or the NACKs, it is thus possible to suppress a decrease in transmission efficiency.

FIG. 6 is a diagram illustrating a specific example of the control information for each slot. FIG. 6 illustrates an example of the control information included in the control channel associated with the slots #0 to #6 included in the burst 310 illustrated in FIG. 5.

As illustrated in FIG. 6, in the control channel of each of the slots, the FB timing information and a counter downlink assignment index (DAI) are included. The FB timing information is control information composed of, for example, four bits, and these four bits are associated with, for example, each of the feedback timings illustrated in FIG. 7. Namely, for example, the FB timing information on the slot #0 is "0101" and this indicates that seven slots after the slot #0 is the feedback timing. Similarly, for example, the FB timing information on the slot #4 is "0001" and this indicates that three slots after the slot #4 is the feedback timing.

It is found that, based on these pieces of FB timing information, in an example illustrated in FIG. 6, the feedback timings of the slots #0 to #4 are the same slot; therefore, the terminal device 200 may simply generate a code book including the ACKs or the NACKs related to the slots #0 to #4.

In contrast, the FB timing information on the slots #5 to #6 is "1111" and this indicates that the feedback timing is at the reception time of the next burst. Consequently, regarding the slots #5 to #6 having the FB timing information or "1111", the terminal device 200 may simply generate a code book together with the ACKs or the NACKs related to the next burst at the reception time of the next burst.

When the code book is generated, the ACK or the NACK related to each of the slots is aligned in the order in accordance with the counter DAI. Namely, for example, the ACK or the NACK of the slot #0 having the counter DAI of "00" is arranged at the top of the code book and, after that, the ACK or the NACK of each of the slots is aligned in an ascending order of the counter DAIs. At this time, because the counter DAI is, for example, two bits, the ACK or the NACK of the slot #4 having the counter DAI of "00" is cyclically arranged next to the ACK or the NACK of the slot #3 having the counter DAI of "11".

FIG. 8 is a diagram illustrating another specific example of the control information for each slot. FIG. 8 illustrates an example of control information included in the control channel of the slots #0 to #6 in the burst 310 illustrated in FIG. 5.

As illustrated in FIG. 8, in the control channel of each of the slot, a window ID, FB timing information, and a counter downlink assignment index (DAI) are included. The window ID is identification information for identifying the slots for which the feedback timings of ACKs or NACKs can be the same slot. Namely, it is possible to collectively feed back the ACKs or the NACKs related to the slots having the same window ID by using a single code book. Furthermore, the window ID indicates whether the ACKs or the NACKs are to collectively be fed back together with the next burst. Namely, in the example illustrated in FIG. 8, regarding the slot having the window ID of "0", ACKs or NACKs are fed back in accordance with the FB timing information, whereas, regarding the slot having the window ID of "1", ACKs or NACKs are fed back together with the next burst regardless of the FB timing information.

Accordingly, in the example illustrated in FIG. 8, it is found that the ACKs or the NACKs related to the slots #0 to #4 are collectively fed back to a single code book immediately after the burst 310 and the ACKs or the NACKs related to the slots #5 to #6 are collectively fed back by a single code book together with the ACKs or the NACKs related to the next burst 320.

Furthermore, the FB timing information illustrated in FIG. 8 is control information composed of, for example, four bits and these four bits are associated with the feedback timing illustrated in, for example, FIG. 9. Namely, for example, the FB timing information in the slot #0 is "0101" and this indicates that "seven slots after" the slot #0 is the feedback timing. Similarly, for example, the FB timing information in the slot #4 is "0001" and this indicates that "three slots after" the slot #4 is the feedback timing.

In contrast, the FB timing information in the slots #5 to #6 is "1111" and this indicates that FB timing information is not applied to the slots #5 to #6. Namely, it is indicated that, because the feedback timing of the slots #5 to #6 having the window ID of "1" conforms to the FB timing information on the next burst 320, the FB timing information in the slots #5 to #6 can be ignored.

Furthermore, in FIGS. 6 and 8, each of the pieces of FB timing information, the counter DAI, and the window ID are illustrated as independent control information; however, a part or all of the information may also be integrated. Namely, for example, four bits of the FB timing information and two bits of the counter DAI may also be integrated into six bits of control information. Furthermore, the number of bits of these pieces of control information can be arbitrarily changed.

Furthermore, instead of defining the window by the window ID, a 1-bit window ID may also be used as the control information that indicates whether the FB timing information is valid. For example, it may also be possible to set the FB timing information in the slot having the window ID of "0" to be valid and the FB timing information in the slot having the window ID of "1" to be invalid. The data channel associated with the control channel including a certain burst of "1:invalid" may also be defined to belong to the same window as that of the data channel associated with the control channel including "0:valid" in the next burst. In this case, "1111" described above can also be used to indicate the feedback timing.

As described above, according to the embodiment, the base station device performs transmission by including the control information that specifies the number of slots up to the feedback timing into the predetermined number of slots that are present from the top from among the plurality of slots constituting the burst and by including, in the rearward slots in the burst, the control information that designates to collectively performs feedback at the reception time of the next burst. Then, the terminal device generates a code book including the ACKs or the NACKs related to the predetermined number of slots from the top of the received burst and performs feedback at the feedback timing specified by the control information. Furthermore, the terminal device holds the ACKs or the NACKs related to the rearward slots in the burst until the reception time of the next burst, generates a code book by collecting the ACKs or the NACKs related to the next burst, and performs feedback at the feedback timing specified by the control information on the next burst. Consequently, it is possible to reduce the number of times of feedback of the ACKs or the NACKs to the minimum and it is thus possible to decrease a frequency in which the U band is occupied by feedback of the ACKs or the NACKs. As a result, continuous transmission of the bursts in the downlink is not limited due to feedback of the ACKs or the NACKs, it is thus possible to suppress a decrease in transmission efficiency.

Furthermore, in the embodiment described above, it is assumed that the code book including the ACKs or the NACKs is transmitted by using the slot immediately after the burst; however, when the U band is busy at the timing immediately after the burst, the code book is not transmitted. In such a case, the base station device 100 that detects that the code book is not received may also request to transmit the code book at the time of next burst and, immediately after this burst, an un-transmitted code book may also be transmitted.

Specifically, for example, as illustrated in FIG. 10, a description will be given of a case in which, as an example, bursts 330, 340, and 350 are transmitted from the base station device 100 to the terminal device 200. In FIG. 10, each of the bursts 330, 340, and 350 has seven slots and the FB timing information is included in each of the slots. The FB timing information in each of the slots indicates "7" to "3" that specifies the number of slots up to the feedback timing or indicates "N" that designates to collectively perform feedback together with the next burst.

Based on these pieces of the FB timing information, the five slots from the top of the burst 330 constitute a window #0 that is capable of simultaneously performing feedback of the ACKs or the NACKs, whereas the rearward two slots in the burst 330 and the five slots from the top in the burst 340 constitute a window #1 that is capable of simultaneously performing feedback of the ACKs or the NACKs. Similarly, the rearward two slots in the burst 340 and the five slots from the top in the burst 350 constitute a window #2 that is capable of simultaneously performing feedback of the ACKs or the NACKs.

When an idle time period of the U band is a predetermined length as the result of the LBT process, the base station device 100 transmits the burst 330. The terminal device 200 that receives the burst 330 generates a code book related to the slots included in the window #0 and transmits the code book associated with the window #0 by using the slot 331 in accordance with the FB timing information in the slots included in the window #0.

Then, when the idle time period of the U band is again the predetermined length as the result of the LBT process, the base station device 100 transmits the burst 340. The terminal device 200 that receives the burst 340 generates a code book related to the slots included in the window #1 and attempts to transmit the code book associated with the window #1 in accordance with the FB timing information in the slots in the burst 340 included in the window #1. However, in a case in which the U band is busy immediately after the burst 340, the terminal device 200 holds the code book associated with the window #1 instead of transmitting the code book.

Then, when the idle time period of the U band is the predetermined length as the result of a regular LBT process, the base station device 100 transmits the burst 350. At this time, the base station device 100 detects that the code book associated with the window #1 is not received, and then, includes the control information that instructs to transmit the code book associated with the window #1 into the slots included in the burst 350. The terminal device 200 that receives the burst 350 generates a code book related to the slots included in the window #2 and transmits the code book associated with the window #2 by using a slot 351 in accordance with the FB timing information in the slots in the burst 350 included in the window #2.

Furthermore, because the control information that designates to transmit the code book associated with the window #1 is included in the burst 350, the terminal device 200 transmits the code book associated with the window #1 by using a slot 352 located immediately after the slot 351. Consequently, the code book that is associated with the window #1 and that is not transmitted due to busy in the U band is fed back to the base station device 100.

In FIG. 10, the code book associated with the window #1 is fed back in a separated manner from the code book associated with the window #2; however, un-transmitted code books may also be integrated and fed back. Namely, for example, as illustrated in FIG. 11, when the code book associated with the window #1 is not transmitted immediately after the burst 340, a single code book associated with the window #1 and the window #2 may also be generated and fed back by using a slot 355 located immediately after the burst 350. In this case, it may also be possible to use both cases, i.e., a case in which the control information that designates to transmit the associated code book by including the window #1 is included in a slot in the burst 350 and a case in which the control information is not included in a slot in the burst 350. In a case in which the control information is included, the control information may also be included in the control channel that includes allocation information related to the data channel or the control information may also be included in the control channel that does not include the allocation information related to the data channel.

In a case in which the control information is included in the control channel that includes the allocation information related to the data channels, for example, in addition to the ACKs or the NACKs associated with the window #1 to which the data channels of the current slots belong, the control information that designates, by one bit, whether feedback is performed by integrating the ACKs or the NACKs associated with immediately before the window #1 into a single code book may also be included. By doing so, there is no need to arrange a new control channel.

In contrast, in a case in which the control information is included in the control channel that does not include the allocation information related to the data channels, because an independent control channel is used, an amount of resources used for transmission is increased; however, because it is also possible to perform transmission by using the slot in which the data channel addressed to the terminal device 200 is not present, it is possible to enhance flexibility of channel arrangements.

Furthermore, in a case in which the control information that designates to transmit the associated code book including the window #1 is not included in the slot in the burst 350, it may also be possible to previously indicate, by using a higher layer signal, such as radio resource control (RRC), to generate and feed back a single code book associated with a plurality of un-transmitted windows when the immediately before code book associated with the window #1 is not yet transmitted.

Furthermore, in the embodiment described above, a description has been given of a case in which the base station device 100 and the single piece of the terminal device 200 performs communication by using the U band; however, the base station device 100 may also communicate with a plurality of terminal devices by using the U band. Namely, the data channels addressed to a terminal device other than the terminal device 200 may also be multiplexed in the time direction or the frequency direction. Furthermore, the transmission timing of the code book including the ACKs or the NACKs may also be slots other than the slot immediately after the burst, or slots that are different for each terminal device may also be designated. Furthermore, carrier aggregation in the U band may also be used between the base station device 100 and the terminal device 200. When the carrier aggregation is used, the ACKs or the NACKs related to all of the bursts that are transmitted and received in a plurality of carriers may also be collectively fed back in one of the carriers.

Furthermore, in the embodiment described above, it is assumed that the burst is constituted from the plurality of slots; however, the configuration unit of the burst is not always slots. Namely, the burst is a signal having a relatively large time length constituted from a plurality of continuous time units.

According to an aspect of the base station device, the terminal device, and the wireless communication system, an advantage is provided in that it is possible to suppress a decrease in transmission efficiency.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
a processor that executes a process including
generating a first data channel,
generating a control channel that includes allocation information on the first data channel, group identifying information for identifying a group of data channel and control information that instructs to collectively feed back an acknowledgement related to the first data channel together with an acknowledgement related to a second data channel that belongs to a same group as the first data channel and that is transmitted after the first data channel, and
judging whether a frequency band for which a license is not needed to use in wireless communication is being used by another device; and
a transmitter that transmits, when it is judged that the frequency band is not being used, the first data channel and the control channel by using the frequency band.

2. The base station device according to claim 1, wherein the control channel is transmitted in time units from a top time unit to a predetermined time unit from among one or more time units included in a first burst and includes the control information that specifies timing for feedback of an acknowledgement related to each of the time units.

3. The base station device according to claim 1, wherein the control channel instructs whether to collectively feed back an acknowledgement related to a third data channel that belongs to different group from the first data channel together with the acknowledgement related to the first data channel and the acknowledgement related to the second data channel.

4. A terminal device comprising:
a receiver that receives a first data channel and a second data channel transmitted after the first data channel that are transmitted by using a frequency band for which a license is not needed to use in wireless communication;
a processor that executes a process including
decoding the first data channel,
decoding a control channel that includes control information that instructs to collectively feed back an acknowledgement related to the first data channel together with an acknowledgement related to the second data channel, and
generating, in accordance with the control information decoded, feedback information that includes the acknowledgement related to the first data channel and the acknowledgement related to the second data channel, judging whether the frequency band is being used by another device; and
a transmitter that transmits, when it is judged that the frequency band is not being used, the feedback information by using the frequency band.

5. A wireless communication system comprising:
a base station device; and
a terminal device, wherein
the base station device includes
a first processor that executes a process including
generating a first data channel,
generating a control channel that includes allocation information on the first data channel, group identifying information for identifying a group of data channel and control information that instructs to collectively feed back an acknowledgement related to the first data channel together with an acknowledgement related to a second data channel that belongs to a same group as the first data channel and that is transmitted after the first data channel, and
judging whether a frequency band for which a license is not needed to use in wireless communication is being used by another device, and
a transmitter that transmits, when it is judged that the frequency band is not being used, the first data channel and the control channel by using the frequency band, and
the terminal device includes
a receiver that receives the first data channel and the second data channel,
a second processor that executes a process including
decoding the first data channel,
decoding the control channel associated with the first data channel, and
generating, in accordance with the control information decoded, feedback information that includes the acknowledgement related to the first data channel and the acknowledgement related to second data channel, judging whether the frequency band is being used by another device, and
a feedback information transmitter that transmits, when it is judged that the frequency band is not being used, the feedback information by using the frequency band.

* * * * *